US012793344B2

(12) United States Patent
Fu et al.

(10) Patent No.: US 12,793,344 B2
(45) Date of Patent: Nov. 10, 2026

(54) NORMAL AND MESH DETAIL SEPARATION FOR PHOTOMETRIC TANGENT MAP CREATION

(71) Applicants: SONY GROUP CORPORATION, Tokyo (JP); SONY CORPORATION OF AMERICA, New York, NY (US)

(72) Inventors: Chen Fu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 198 days.

(21) Appl. No.: 18/410,090

(22) Filed: Jan. 11, 2024

(65) Prior Publication Data

US 2025/0232531 A1 Jul. 17, 2025

(51) Int. Cl.
*G06T 17/20* (2006.01)
*G06T 15/04* (2011.01)

(52) U.S. Cl.
CPC ............ *G06T 17/205* (2013.01); *G06T 15/04* (2013.01); *G06T 2210/56* (2013.01)

(58) Field of Classification Search
CPC ... G06T 17/205; G06T 15/04; G06T 2210/56; G06T 15/506
See application file for complete search history.

(56) References Cited

U.S. PATENT DOCUMENTS

| | | | | |
|---|---|---|---|---|
| 9,007,457 B2 | | 4/2015 | Levesque | |
| 10,097,813 B2 | | 10/2018 | Stenger et al. | |
| 2022/0028119 A1 | * | 1/2022 | Rhyu | G06T 9/001 |
| 2022/0130098 A1 | * | 4/2022 | Hunter | G06T 11/10 |
| 2024/0135645 A1 | * | 4/2024 | Ghosh | G06T 15/04 |

FOREIGN PATENT DOCUMENTS

| | | | | |
|---|---|---|---|---|
| CN | 105957154 A | * | 9/2016 | G06T 19/20 |
| CN | 108898665 A | * | 11/2018 | G06T 17/00 |
| JP | 2021-026759 A | | 2/2021 | |

OTHER PUBLICATIONS

Ackermann, et al., "A Survey of Photometric Stereo Techniques", Foundations and Trends in Computer Graphics and Vision, vol. 9, No. 3-4, 2013, pp. 149-254.

(Continued)

*Primary Examiner* — Said Broome
*Assistant Examiner* — Denis Vasiliy Minko
(74) *Attorney, Agent, or Firm* — CHIP LAW GROUP

(57) ABSTRACT

A system and method for normal and mesh detail separation for photometric tangent map creation is provided. The system acquires a base three-dimensional (3D) mesh of an object and a photometric surface normal corresponding to the object. The system computes a mesh density map based on the base 3D mesh and a base normal map based on vertex normal information included in the base 3D mesh. The system determines a correction on the photometric surface normal based on the base normal map and the mesh density map. The system generates a corrected photometric surface normal based on an application of the correction.

17 Claims, 4 Drawing Sheets

(56) References Cited

OTHER PUBLICATIONS

Ghosh, et al., "Multiview Face Capture using Polarized Spherical Gradient Illumination", To appear in ACM TOG 30 (6), 2015, 10 pages.
Nehab, et al., "Efficiently Combining Positions and Normals for Precise 3D Geometry", ACM transactions on graphics (TOG) 24.3, 2005, 8 pages.
Yu, et al., "Depth estimation meets inverse rendering for single image novel view synthesis", CVMP 2019, Dec. 17-18, 2019, 8 pages.
Mostafa, M. G.-H, et al, "Integrating Stereo and Shape from Shading", Image Processing, 1999, ICIP 99. Proceedings. 1999 International Conference on—Kobe, Japan, Oct. 24-28, 1999, vol. 3, 24, XP010368853, pp. 130-134.

* cited by examiner

NORMAL AND MESH DETAIL SEPARATION FOR PHOTOMETRIC TANGENT MAP CREATION

CROSS-REFERENCE TO RELATED APPLICATIONS/INCORPORATION BY REFERENCE

None.

FIELD

Various embodiments of the disclosure relate to three-Dimensional (3D) object scanning and modeling. More specifically, various embodiments of the disclosure relate to a system and a method for normal and mesh detail separation for photometric tangent map creation.

BACKGROUND

Advancements in the field of 3D scanning technologies have led to development of devices (such as 3D scanners) and software tools that may scan 3D objects in a 3D environment and process datasets (i.e., 3D points representing the scanned 3D objects) for building 3D models of the 3D objects. The building of the 3D models may be based on determination of shape, color, texture, material properties and so on, of the 3D objects. One of the most widely used 3D scanning techniques for 3D modeling of a 3D object is photogrammetry, where a set of images of the 3D object may be captured using a set of cameras from different viewpoints of the 3D object. The set of images may be captured based on illumination of the 3D object from different viewpoints using a set of light sources that emit polarized gradient lighting patterns. Based on each image of the captured set of images, a photometric surface normal corresponding to the 3D object may be estimated. The photometric surface normal may indicate surface orientation at each pixel (which may be representative of each point on the surface of the 3D object) in each image. Thus, the photometric normal may provide a description of the shape of the 3D object at the micro-geometry level. However, low-frequency information included in the photometric surface normal may not be consistent, which may lead to errors in construction of a 3D model that corresponds to the surface of the 3D object.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for normal and mesh detail separation for photometric tangent map creation, is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
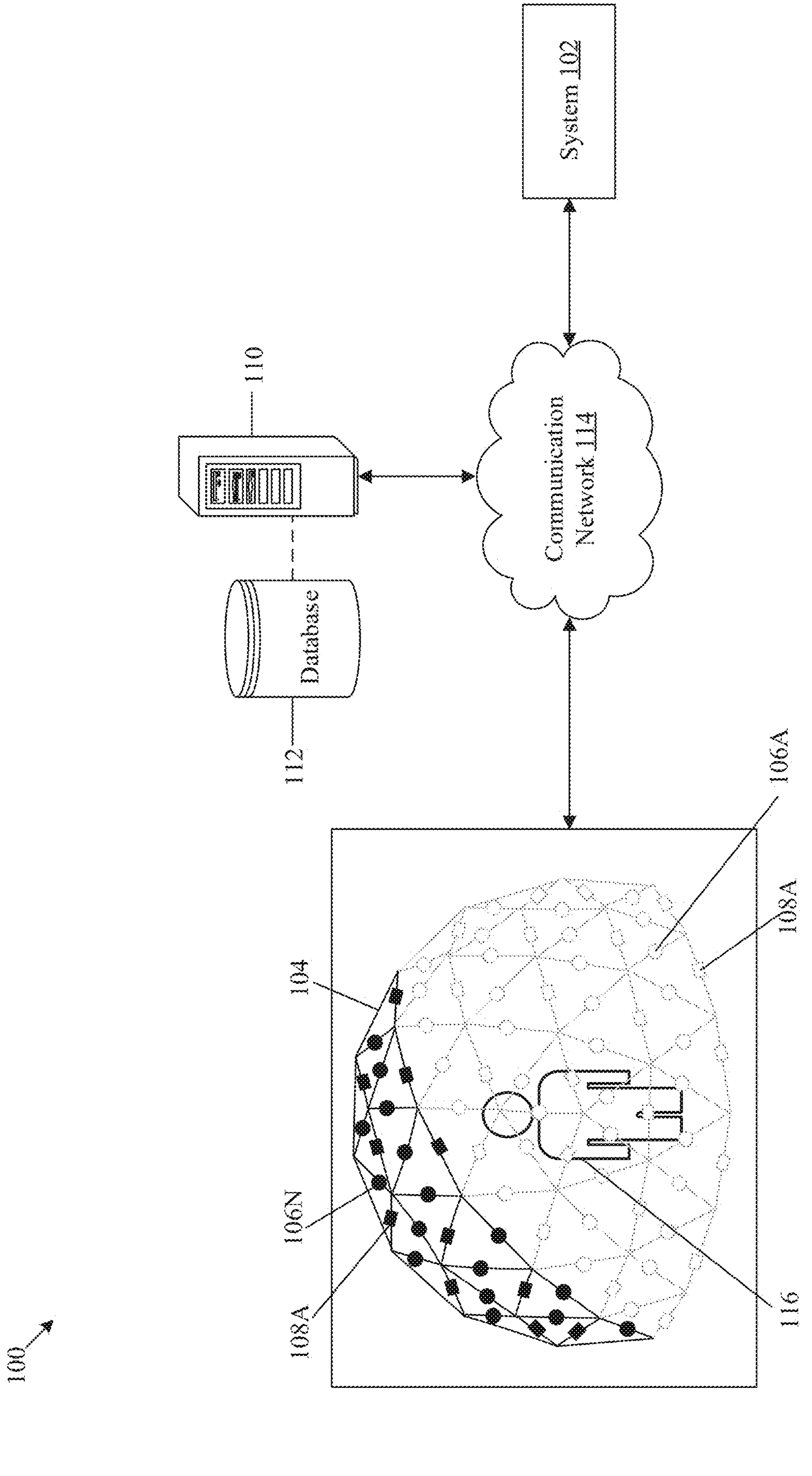
FIG. 1 is a diagram that illustrates an exemplary network environment for normal and mesh detail separation for photometric tangent map creation, in accordance with an embodiment of the disclosure.

The following described implementations may be found in a disclosed system and method for normal and mesh detail separation for photometric tangent map creation. Exemplary aspects of the disclosure provide a system that may include an electronic device (for example, a computing device, a desktop, a laptop, or a personal computer), a set of light sources, and a set of image capture devices. The system may be capable of creating a tangent map, using a photometric surface normal, that may be free from any low-frequency variations. The tangent map may include low frequency variations due to a low-frequency bias of the photometric surface normal. The low-frequency bias may be associated with inconsistent representation of low frequency information included in the photometric surface normal. Application of a correction on the photometric surface normal may remove the low-frequency bias. Subsequently, the corrected photometric surface normal may be used for the creation of the tangent map free from low-frequency variations. Specifically, the system may acquire a base three-dimensional (3D) mesh of an object. The system may further acquire a photometric surface normal corresponding to the object. The system may compute a mesh density map based on the base 3D mesh. The system may further compute a base normal map based on vertex normal information included in the base 3D mesh. Based on the base normal map and the mesh density map, the system may determine the correction that may be required to be applied on the photometric surface normal. The system may generate a corrected photometric surface normal based on an application of the determined correction. The corrected photometric surface normal may be used for the tangent map creation.

3D scanning techniques, such as photogrammetry, may be used for scanning a 3D object and generating a 3D model (i.e., a 3D geometrical representation of the 3D object) of the scanned 3D object. The scanning may involve capturing, using a set of cameras, of a set of images of a 3D environment that may include the 3D object. The set of images may be captured in dynamic lighting conditions. For each pixel in each image of the set of images, a photometric surface normal corresponding to a point on the surface of the 3D object may be estimated. The estimation may be based on characteristics such as brightness, distance between the 3D object and each light source that may be used to illuminate the 3D object when the set of images are captured, a count of light sources, reflectance properties associated with the 3D object based on illumination of the object from a certain direction, and intensity of each pixel (indicative of intensity of light reflected from a point on the surface of the 3D object represented by the corresponding pixel) of each image of the set of images. The photometric surface normal may indicate a surface orientation at each pixel representing a corresponding point on the surface of the 3D object. Based on the photometric surface normal, a 3D model corresponding to the 3D object may be generated. The shape of the 3D model may represent the surface of the 3D object at a micro-geometry level.

However, low-frequency information in the photometric surface normal may not be as consistent as high-frequency information. Due to such low-frequency bias, the 3D model, generated based on the photometric surface normal in world-space or object-space, may not be an accurate representation of the shape or surface of the 3D object. The photometric surface normal in the world-space or object-space, may be required to be transferred to a tangent space as a relightable asset (or model) of the 3D object. The low-frequency bias of the photometric surface normal may lead to an appearance of undesirable low-frequency variations in a tangent map that may be generated based on the transfer to the tangent space. Usage of the tangent map for generation of a 3D model may lead to appearance of undesired objects in the 3D model during the rendering of the 3D model. The appearance of the undesired objects on the surface of the 3D model may reduce consistency between the surface of the 3D model and the surface of the 3D object. Further, a set of 3D points (i.e., a point cloud) or a mesh (constructed based on the 3D points) representative of the 3D object, generated based on the set of images of the 3D object, may be fine-tuned or modified (by a 3D artist) to generate a refined 3D model corresponding to the 3D object. The refined 3D model may be significantly different from the 3D model that may be reconstructed based on the photometric surface normal.

To address such issues, the proposed system may modify or correct the photometric surface normal based on a base mesh. The photometric surface normal may be corrected such that a tangent map generated based on the corrected photometric surface normal does not include any low frequency variations. Based on a photometric scan of a 3D object in a 3D environment, a base 3D mesh corresponding to the 3D object may be generated. From the base 3D mesh, a mesh density map and a mesh normal map be generated. The mesh normal map may include low-frequency information that may be associated with a geometry of the base 3D mesh and the mesh density map may include vertex density information associated with vertices of the base 3D mesh. The mesh density map and the mesh normal map may be used to determine a correction that may be required to be applied to the photometric surface normal. The correction may be applied to the photometric surface normal with respect to the base normal map which may be used as a reference normal. The amount of correction applied on the photometric surface normal may be based on the mesh density map. The corrected photometric surface normal in the world-space (or the object-space) may be converted to a tangent-space for generation of a tangent map. The tangent map may be generated based on a UV layout (which may be a 2D image space) of the base 3D mesh (in 3D space) and may not include any low frequency variations.

FIG. 1 is a diagram that illustrates an exemplary network environment for normal and mesh detail separation for photometric tangent map creation, in accordance with an embodiment of the disclosure. With reference to FIG. 1, there is shown a network environment 100. The network environment 100 includes a system 102, a rig 104, a set of light sources 106, a set of image capture devices 108, and a server 110. The rig 104 may be formed around a 3D physical space and include the set of light sources 106 and the set of image capture devices 108. In at least one embodiment, the set of light sources 106 may include a first light source 106A, a second light source 106B, . . . , and an $N^{th}$ light source 106N. In at least one embodiment, the set of image capture devices 108 may include a first image capture device 108A, a second image capture device 108B, . . . , and an $N^{th}$ image capture device 108N. In at least one embodiment, the server 110 may include a database 112. The system 102 may communicate with the set of light sources 106, the set of image capture devices 108, and the server 110, through one or more networks (such as, a communication network 114). There is further shown an object 116 (such as, a human subject) inside the rig 104. The system 102 may control the set of light sources 106 and the set of image capture devices 108. In some embodiments, the system 102 may include the set of light sources 106 and the set of image capture devices 108.

The system 102 may include suitable logic, circuitry, interfaces, and/or code that may be configured to control the set of light sources 106 to trigger flash pulses, which may correspond to spherical gradient lighting patterns, to illuminate the object 116 (i.e., the human subject). The system 102 may further control the image capture devices 108 to capture a set of images of the object 116 based on the illumination of the object 116 using the set of light sources 106. Based on the captured set of images, a photometric surface normal and a base 3D mesh representative of the object 116 may be generated. The system 102 may further generate a base normal map and a mesh density map based on the base 3D mesh. The base normal map and a mesh density map may be used for correction of the photometric surface normal. The corrected photometric surface normal may be used for generation of a tangent map that is free from low-frequency variations. Examples of the system 102 may include, but may not be limited to, a server, a volumetric capture controller, a 3D graphic engine, a 3D modeling or simulation engine, a volumetric studio controller, a desktop, a tablet, a laptop, a computing device, a smartphone, a cellular phone, a mobile phone, or a consumer electronic (CE) device having a display.

The rig 104 may correspond to a physical device that may be used to mount the set of light sources 106 and the set of image capture devices 108 together to a single 3D-system to capture a set images of a scene (such as, the set of images of the object 116 inside the rig 104. The rig 104 may be comprised of the plurality of structures. By way of example and not limitation, each structure (in triangular shape) may include at least one light source of the set of light sources 106 (such as the first light source 106A represented by a circle in FIG. 1) and at least one image capture device of the set of image capture devices 108 (such as the first image capture device 108A represented by a rectangle in FIG. 1). It may be noted that the rig 104, shown in FIG. 1 as dome shaped, is presented merely as an example. The rig 104 may be in different shapes or arrangement, without a deviation from scope of the disclosure.

Each light source of the set of light sources 106 may include suitable logic, circuitry, interfaces, and/or code that may be configured to receive control instructions from the system 102 to illuminate the object 116. In at least one embodiment, each light source of the set of light sources 106 may correspond to an electronically controlled lighting fixture. The light sources of the set of light sources 106 may be spatially arranged in the rig 104 such that the object 116 is illuminated from different viewpoints such as a left-hand side of the object 116, a right-hand side of the object 116, top of the object 116, bottom of the object 116, front of the object 116, or back of the object 116. Each light source of the set of light sources 106 may include one or more polarizers (i.e., polarizing filters). The one or more polarizers may polarize light emitted by a corresponding light source to generate spherical gradient lighting patterns. Examples of each light source of the set of light sources 106 may include, but are not limited to, an incandescent lamp, a halogen lamp, a Light Emitting Diode (LED) lamp, a metal halide lamp, a low-pressure sodium lamp, a fluorescent lamp/tube, a high intensity discharge lamp, or a neon lamp.

Each image capture device of the set of image capture devices 108 may include suitable logic, circuitry, interfaces, and/or code that may be configured to receive control instructions from the system 102 to capture a set of images of the object 116. The control instructions, received by the set of image capture devices 108 from the system 102, may include different imaging parameters such as field-of-view (FOV), zoom, focus, exposure, gain, orientation or tilt, ISO, brightness, and so on. The set of images may be captured based on the received imaging parameters and illumination of the object 116 by the set of light sources 106. The image capture devices of the set of image capture devices 108 may be spatially arranged in the rig 104 such that an image of the object 116 is captured from different viewpoints. Thus, the set of image capture devices 108 may capture a 360-degree view of the object 116. Each image capture device may be synchronized with other image capture device of the set of image capture devices 108. The set of image capture devices 108 may transmit the captured set of images of the object 116 to the system 102 based on reception of control instructions from the system 102.

In at least one embodiment, each image capture device of the set of image capture devices 108 may be a high-resolution still camera with burst capability. The image capture devices of the set of image capture devices 108 may capture fine skin details that may be used for generation of high-resolution mesh, normal maps, texture maps, height maps, and tangent maps. The image capture devices may provide optimum low light performance and have low sensor noise. Examples of each image capture device of the set of image capture devices 108 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The server 110 may include suitable logic, circuitry, interfaces, and/or code that may be configured to receive the set of images of the object 116 from the system 102 or the database 112 (as a query response). In at least one embodiment, the server 110 may determine a 3-Dimensional (3D) facial geometry associated with the object 116, based on the set of images of the object 116, to construct a photo-realistic relightable model (i.e., a base 3D mesh) of the head of the object 116 (i.e., the human subject). The determination of the 3D facial geometry and reconstruction of facial shape (i.e., the base 3D mesh) of the human subject may be based on information extracted from the set of images of the human subject. The server 110 may be further configured to generate a base normal map and a mesh density map based on the base 3D mesh and extract an UV layout of the base 3D mesh. The server 110 may transmit the base 3D mesh, the base normal map, mesh density map, and the UV layout of the base 3D mesh to the system 102. In some embodiments, the server 110 may generate a photometric surface normal based on the set of images of the object 116. Thereafter, the server 110 may correct the photometric surface normal using the base normal map and the mesh density map. The correction may be based on removal of low-frequency inconsistencies inherent in the generated photometric surface normal. The server 110 may generate a tangent map based on the corrected photometric surface normal. Thereafter, the server 110 may transmit the corrected photometric surface normal and the tangent map to the system 102. The server 110 may execute operations through web applications, cloud applications, HTTP requests, repository operations, file transfer, and the like. Example implementations of the server 110 may include, but are not limited to, a database server, a file server, a web server, an application server, a mainframe server, a cloud computing server, or a combination thereof.

In at least one embodiment, the server 110 may be implemented as a plurality of distributed cloud-based resources by use of several technologies that are well known to those ordinarily skilled in the art. A person with ordinary skill in the art will understand that the scope of the disclosure may not be limited to the implementation of the server 110 and the system 102 as separate entities. In certain embodiments, the functionalities of the server 110 can be incorporated in its entirety or at least partially in the system 102, without a departure from the scope of the disclosure.

The database 112 may include suitable logic, interfaces, and/or code that may be configured to store the set of images of the object 116 captured by the set of image capture devices 108. The database 112 may receive a query from the system 102 or the server 110 for the set of images of the object 116. Based on the received query, the database 112 may generate a query response that includes the queried set of images of the object 116. The database 112 may be derived from data off a relational or non-relational database or a set of comma-separated values (csv) files in conventional or big-data storage. The database 112 may be stored or cached on a device, such as the system 102 or the server 110. In an embodiment, the database 112 may be hosted on a plurality of servers stored at same or different locations. The operations of the database 112 may be executed using hardware including a processor, a microprocessor (e.g., to perform or control performance of one or more operations), a field-programmable gate array (FPGA), or an application-specific integrated circuit (ASIC). In some other instances, the database 112 may be implemented using software.

The communication network 114 may include a communication medium through which the system 102, the set of light sources 106, the set of image capture devices 108, and the server 110, may communicate with each other. The communication network 114 may be a wired or wireless communication network. Examples of the communication network 114 may include, but may not be limited to, Internet, a Wireless Fidelity (Wi-Fi) network, a Personal Area Network (PAN), a Local Area Network (LAN), or a Metropolitan Area Network (MAN). Various devices in the network environment 100 may be configured to connect to the communication network 114, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The object 116 may be an animate or an inanimate object and may be present in 3D physical space inside the rig 104. The animate object may correspond to a living object that may possess a quality or an ability of motion whereas the inanimate object may correspond to a non-living object that may lack the quality or the ability of motion. Examples of object 116 may include, but are not limited to, a human, an animal, or any non-living object (such as, but not limited to, a musical instrument, a sports object, a furniture item, or an electrical device).

In operation, the system 102 may be configured to acquire a base 3D mesh of the object 116. The acquisition of the base 3D mesh may be triggered based on reception of a user input. The user input may be indicative of an instruction to retrieve a 3D model of an object (for example, the object 116) inside the rig 104. On reception of the user input, the system 102 may control the set of light sources 106 to illuminate the object 116 and the set of image capture devices 108 to capture a set of images of the object 116 illuminated by the set of light sources 106. The set of images may include multiple subsets of images. Each subset of images may be captured by the set of image capture devices 108 in a particular lighting condition. A lighting condition may be actualized based on emission of a cross polarized or a parallel polarized spherical gradient lighting pattern by a subset of light sources of the set of light sources 106. Thus, the set of images of the object 116 may be captured in dynamic lighting conditions.

Based on the set of images, the system 102 may construct a 3D mesh. The construction of the 3D mesh may include construction of a 3D point cloud geometry that corresponds to the object 116. The 3D point cloud geometry may be constructed based on the set of images of the object 116, and additional information associated with the object 116 (such as color information and depth information). Thereafter, 3D points of the 3D point cloud geometry may be meshed to construct the 3D mesh. The 3D mesh may be further refined based on a user input to generate the base 3D mesh. The base 3D mesh may be a geometric data structure that includes a set of connected triangles (whose vertices may correspond to the 3D points of the 3D point cloud geometry). The surface (i.e., edges) of the base 3D mesh may represent the surface of the object 116.

The system 102 may be further configured to acquire a photometric surface normal corresponding to the object 116. The acquisition of the photometric surface normal may be triggered based on reception of a user input. Based on the user input, the system may retrieve the set of images of the object 116 (captured by the set of image capture devices 108). The photometric surface normal may be determined for each pixel of each image of the set of images of the object 116 that may represent a point on the surface of the object 116 illumined in different lighting conditions by the set of light sources 106. For such determination, the system 102 may determine reflectance map for each light source of the set of light sources 106 and intensity of each pixel that may represent a point on the surface of the object 116. Based on intersection of the reflectance maps of the light sources of the set of light sources 106 that may be facing the point, and the intensity of each pixel of images of the set of images that represent the point, surface orientation at the point may be determined. Similarly, surface orientation of other points on the surface of the object may be determined. The surface orientations of the points of the object 116 may correspond to the acquired photometric surface normal.

The system 102 may be further configured to compute a mesh density map based on the base 3D mesh. The mesh density map may include a value of local vertex density for each vertex of the base 3D mesh. The local vertex density may be determined for each vertex and may be indicative of a count of vertices or surfaces in the vicinity of a corresponding vertex of the base 3D mesh. The count of vertices in high gradient regions (i.e., regions where change in surface orientation with respect to an area covered by the regions is higher) of the base 3D mesh may be higher compared to the count of vertices in lower gradient region. Therefore, local vertex density for a vertex of the base 3D mesh representing a first region of the surface of the object 116 with greater irregularities in surface orientation may be higher compared to that for a vertex representing a second region where the surface orientation is uniform (compared to the first region).

The system 102 may be further configured to compute a base normal map based on vertex normal information included in the base 3D mesh. The base normal map may be indicative of direction towards which each vertex and each surface (which may be a face of a polygon (such as a triangle)) of the base 3D mesh may be pointing. In accordance with an embodiment, the computation of the base normal map may be based on information associated with the normal (direction) of each vertex of the base 3D mesh. The information may be determined based on whether each surface (or the face of each polygon) is flat (faceted or distinct) or whether the base 3D mesh is smoothened. The normal of each vertex may be distinctly determined if one or more surfaces associated with a corresponding vertex is flat. Whereas the smoothening of the base 3D mesh may indicate that the normal of a vertex may be a shared normal and the computation of the normal may be based on the normal associated with each surface of a set of surfaces associated with the vertex. The surfaces of the set of surfaces may be combined for achieving the smoothening effect. In some embodiments, the computation of the base normal map may be based on a 3D location of each vertex of the base 3D mesh. The information associated with the normal may be determined based on the 3D location of the corresponding vertex.

The system 102 may be further configured to determine a correction on the photometric surface normal based on the base normal map and the mesh density map. The correction may be required on the photometric surface normal may be required in order to eliminate low-frequency bias that may be inherent in the photometric surface normal. The acquired photometric surface normal may include inconsistent low-frequency information which may contribute to the low-frequency bias. The elimination of the low-frequency bias may be required for conversion of the photometric surface normal into a tangent space. In accordance with an embodiment, the correction may correspond to a degree of rotation that may be required to be applied on the photometric surface normal for the elimination of the low-frequency bias. The degree of rotation may be determined based on the base normal map and the mesh density map.

The system 102 may be further configured to generate a corrected photometric surface normal based on an application of the correction. The elimination of the low-frequency bias from the acquired photometric surface normal may lead to the generation of the corrected photometric surface normal. The application of the correction, i.e., the rotation of the acquired photometric surface normal by the determined degree may lead to removal of the inconsistent low-frequency information (i.e., the elimination of the low frequency bias) from the acquired photometric surface normal. The corrected photometric surface normal may be transferred to the tangent space for generation of a tangent map. The tangent map may not include low-frequency variations and used for reconstruction of the surface of the object 116 in a 3D model (such as a 3D mesh).

Figure 2:
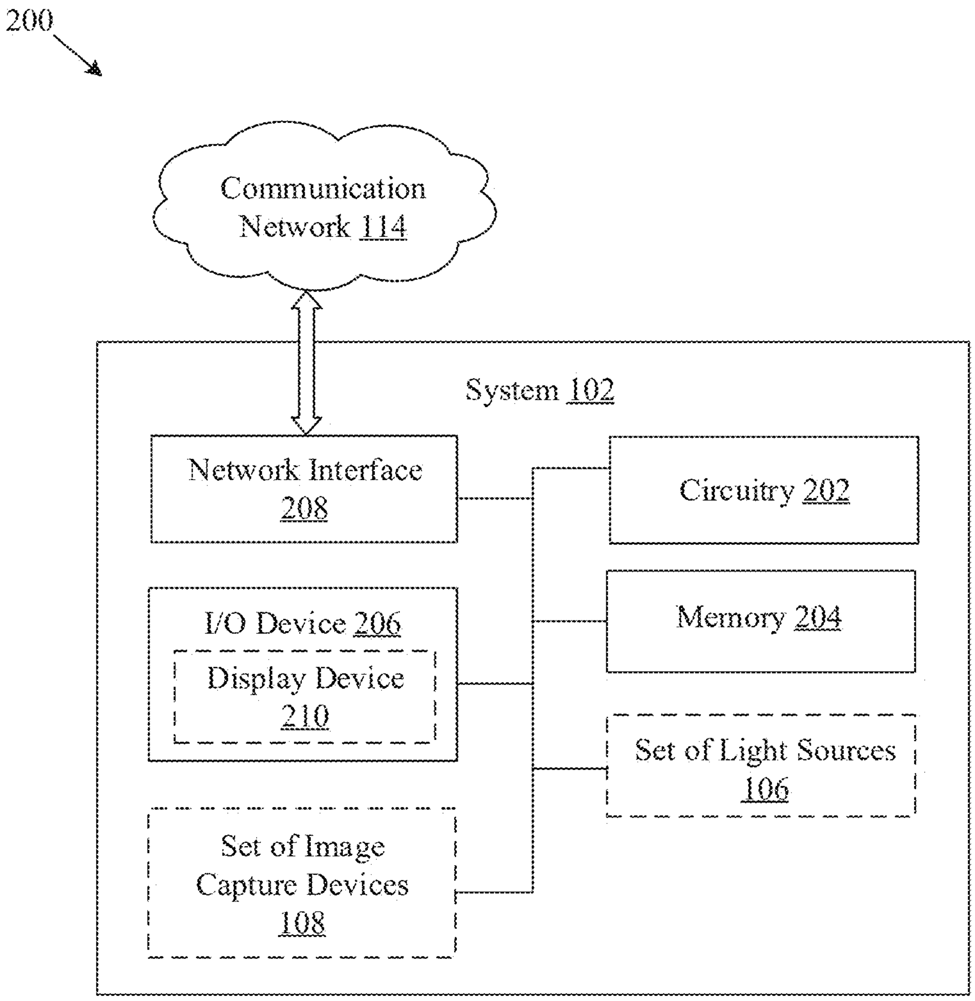
FIG. 2 is a block diagram that illustrates an exemplary system of FIG. 1, for normal and mesh detail separation for photometric tangent map creation, in accordance with an embodiment of the disclosure.

FIG. 2 is a block diagram that illustrates an exemplary system of FIG. 1, for normal and mesh detail separation for photometric tangent map creation, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, an input/output (I/O) device 206, a network interface 208, the set of light sources 106, and the set of image capture devices 108. In at least one embodiment, the I/O device 206 may also include a display device 210. The circuitry 202 may be communicatively coupled to the memory 204, the I/O device 206, the network interface 208, the set of light sources 106, and the set of image capture devices 108, via wired or wireless communication of the system 102.

The circuitry 202 may include suitable logic, circuitry, and interfaces that may be configured to execute program instructions associated with different operations to be executed by the system 102. The operations may include an acquisition of the base 3D mesh of the object 116, an acquisition of a photometric surface normal that may correspond to the object 116, a computation of a mesh density map based on the base 3D mesh, a computation of a base normal map based on vertex normal information included in the base 3D mesh, a determination of a correction on the photometric surface normal based on the base normal map and the mesh density map, and a generation of a corrected photometric surface normal based on an application of the correction. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the system 102). In an embodiment, the memory 204 may be configured to store the set of images of the object 116 captured by the set of image capture devices 108. The memory 204 may be further configured to store the base 3D mesh (for example, 3D geometry of the head (face) of a human subject (i.e., the object 116)), the base normal map and the mesh density map. The memory 204 may be further configured to store the acquired photometric surface normal, the corrected photometric surface normal, and a tangent map (which may be generated based on the corrected photometric surface normal). Examples of implementation of the memory 204 may include, but are not limited to, Random Access Memory (RAM), Read Only Memory (ROM), Hard Disk Drive (HDD), Electrically Erasable Programmable Read-Only Memory (EEPROM), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive user inputs that may be associated with the triggering of the acquisition of the base 3D mesh of the object 116, the triggering of the acquisition of the photometric surface normal, and the generation of the tangent map based on the corrected photometric surface normal. The I/O device 206 may further receive a user input indicative of an instruction (to the set of light sources 106) to trigger flash pulses to illuminate the object 116. The I/O device 206 may further receive a user input indicative of an instruction (to the set of image capture devices 108) to capture the set of images of the object 116 based on the illumination of the object 116. Examples of the I/O device 206 may include, but are not limited to, a touch screen, a keyboard, a mouse, a joystick, a microphone, the display device 210, and a speaker.

The I/O device 206 may include the display device 210. The display device 210 may include suitable logic, circuitry, and interfaces that may be configured to receive inputs from the circuitry 202 to render, on a display screen, the captured set of images of the object 116, the base 3D mesh, the base normal map, the mesh density map, the acquired photometric surface normal, the corrected photometric surface normal, and the tangent map. In at least one embodiment, the display screen of the display device 210 may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202, the set of light sources 106, the set of image capture devices 108, and the server 110, via the communication network 114. The network interface 208 may be implemented by use of various known technologies to support wired or wireless communication of the system 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless pear-to-pear protocol.

The functions or operations executed by the system 102, as described in FIG. 1, may be performed by the circuitry 202. Operations executed by the circuitry 202 are described in detail, for example, in FIGS. 3 and 4.

Figure 3:
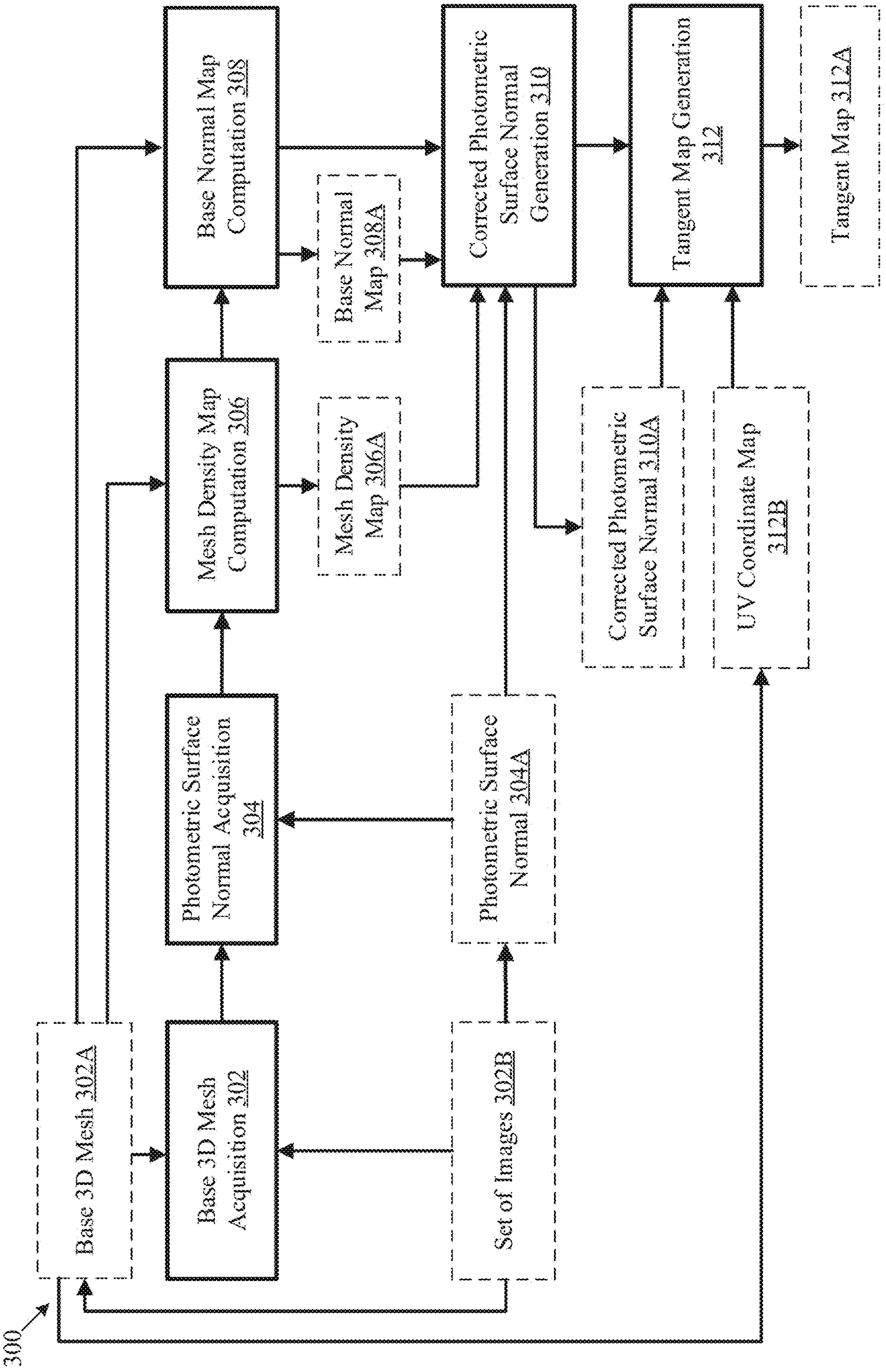
FIG. 3 is a diagram that illustrates an exemplary execution pipeline for normal and mesh detail separation for photometric tangent map creation, in accordance with an embodiment of the disclosure.

FIG. 3 is a diagram that illustrates an exemplary execution pipeline for normal and mesh detail separation for photometric tangent map creation, in accordance with an embodiment of the disclosure. FIG. 3 is explained in conjunction with elements from FIG. 1 and FIG. 2. With reference to FIG. 3, there is shown an exemplary pipeline 300. The exemplary pipeline 300 may include a set of operations (for example, operations 302 to 312) that may be executed by one or more components of FIG. 1, such as, the circuitry 202 of the system 102. The set of operations may be performed to correct a photometric surface normal (in object space or word space) and generate a tangent map (in tangent space) based on a corrected photometric surface normal.

At 302, a base 3D mesh (for example, a base 3D mesh 302A) of an object (such as, an animate 3D object or an inanimate 3D object), situated in a 3D space, may be acquired based on a set of images (for example, a set of images 302B) of the object. In at least one embodiment, the circuitry 202 may be configured to acquire the base 3D mesh 302A of the object based on the set of images 302B of the object. The set of images 302B may be captured based on illumination of object by a set of light sources. The circuitry 202 may control the set of light sources to illuminate the object. The light sources of the set of light sources may illuminate the object from multiple directions (or viewpoints associated with the object). The set of light sources may generate a set of cross-polarized or parallel-polarized spherical gradient lighting patterns for illuminating the subject. Once the object is illuminated, the circuitry 202 may be configured to control a set of image capture devices to capture the set of images 302B of the object. The set of images 302B may include images that have been captured from different viewpoints of the object. Each image capture device of the set of image capture devices may capture an image of the set of images 302B from a certain viewpoint of the object. The set of images 302B may include a plurality of subsets of images. Each subset of images of the plurality of subsets of images may be captured by the set of image capture devices 108 when the object is illuminated by a certain spherical gradient lighting pattern. In an embodiment, the image capture devices of the set of image capture devices 108 may be synchronized. Therefore, each subset of images of the plurality of subsets of images may be captured at a same time-instant when the object may be illuminated by a subset of light sources of the set of light sources 106 using a certain spherical gradient lighting pattern.

In accordance with an embodiment, the circuitry 202 may be configured to receive a photometric scan of the object that may include a plurality of images (i.e., the set of images 302B) of the object captured from one or more viewpoints in the 3D space (such as space inside a rig or a light cage). The scanned object may be exposed to dynamic lighting conditions (i.e., different spherical gradient lighting patterns) throughout a duration of the acquisition of the photometric scan. The photometric scan may further include depth information and color information associated with the scanned object. The depth information may be obtained using one or more depth sensors in the 3D space that may capture the depth information from a set of viewpoints associated with the object. Further, the color information may be obtained using one or more red-green-blue (RGB) sensors or infrared sensors. Once the set of images of the object are obtained, the circuitry 202 may further reconstruct a 3D mesh based on the plurality of images included in the photometric scan.

The 3D mesh may be a graphical model that defines a reconstructed surface (shape and geometry) of the object using a set of polygons (such as triangles). The reconstruction of the 3D mesh may include an estimation of intrinsic and/or extrinsic parameters associated with each image capture device of the set of image capture devices 108, extraction of a set of features from each image of the captured set of images 302B, feature matching based on features of candidate image pairs of the captured set of images 302B, creation of 3D points in 3D space based on the matching features of each candidate image pair, generation of a 3D point cloud based on the 3D points, and a meshing operation on the 3D point cloud. The meshing operation may lead to the reconstruction of the 3D mesh. Thereafter, the reconstructed 3D mesh may be refined the 3D mesh based on an input from a 3D artist. The refinement may be necessary for removal of undesirable structures, deformations, or any irregularities of surface of the reconstructed 3D mesh. The refined 3D mesh may correspond to the acquired base 3D mesh 302A.

At 304, a photometric surface normal 304A corresponding to the object may be acquired. In at least one embodiment, the circuitry 202 may be configured to acquire the photometric surface normal 304A corresponding to the object (i.e., the scanned object). The acquisition of the photometric surface normal 304A may be based on the captured set of images 302B. The photometric surface normal 304A may be generated based on a fitment of a surface reflectance model to the plurality of images (i.e., the set of images 302B) included in the photometric scan. The photometric surface normal 304A may be indicative of surface orientations associated with points on the surface of the object, which may be represented by pixels of each image of the set of images 302B. The surface orientation associated with a point (i.e., the surface normal) on the surface of the object may be determined based on an intensity of each pixel of at least two images of the set of images 302B that may represent the point. The intensity of a pixel of an image may be determined based on properties (such as radiant intensity, distance, direction, and so on) of a subset of light sources of the set of light sources 106 that may be used to illuminate the point on the surface of the object represented by the pixel (when the image may have been captured), reflectance properties associated with the point, the surface normal (i.e., the surface orientation at the point) of the pixel, and a reflectance map associated with each light source of the subset of light sources. Therefore, based on the intensity of the pixel (determined based on the image), the properties of the subset of light sources (which may be known), reflectance properties associated with the point (which may be known), and the reflectance maps associated with the subset of light sources (determined based on the reflectance properties), the surface orientation at the point may be determined.

The reflectance properties associated with a point may indicate an ability of the point on the surface of the object to reflect light in a particular direction based on a direction in which light is emitted by a corresponding light source for illuminating the point. Whereas the reflectance map may indicate a mapping between a set of values of surface orientation associated with the point and an intensity of a pixel (of an image) representing the point, when the point is illuminated by a light source (for the capturing of the image). Therefore, the circuitry 202 may determine the actual value of the surface orientation of the point amongst the set of values based on an intersection of the reflectance maps associated with the subset of light sources. Similarly, the surface orientations associated with the other points of the surface of the scanned object may be determined. The surface orientations of all points on the surface of the scanned object may constitute the acquired photometric surface normal 304A.

At 306, a mesh density map 306A may be computed based on the base 3D mesh 302A. In at least one embodiment, the circuitry 202 may be configured to compute the mesh density map 306A based on the base 3D mesh 302A. For each region of the base 3D mesh 302A, that may include a subset of vertices of a set of vertices of the base 3D mesh 302A, a mesh density value may be computed. The computed mesh density value may correspond to a local vertex density of a vertex of the subset of vertices. Thus, the mesh density map 306A may include a plurality of points, each of which may represent the local vertex density of a corresponding vertex of the base 3D mesh 302A.

In accordance with an embodiment, the computed mesh density value of the vertex may be in the range 0-1. A lower mesh density value (close to "0") may indicate that a count of vertices in the region (i.e., number of vertices in the subset of vertices or number of neighboring vertices of the vertex) may be lower than a threshold number of vertices. Further, differences in the orientation or the direction of surface normal between the surfaces or faces (which may be represented by sides of polygons) in the region of the base 3D mesh 302A (that includes the vertex) may be minuscule. On the other hand, a higher mesh density value (close to "1") may indicate that the count of vertices in the region may be higher than the threshold number of vertices. Further, the direction of surface normal of each surface (which may be represented by a side of a polygon) in the region of the base 3D mesh 302A may differ significantly from the directions of surface normal of other surfaces in the region (i.e., the neighboring surfaces of the corresponding surface) of the base 3D mesh 302A.

Similarly, a mesh density value corresponding to a local vertex density value may be computed for each of the other vertices of the set of vertices. The mesh density values computed for all vertices of the set of vertices of the base 3D mesh 302A may constitute the mesh density map 306A. The regions of the base 3D mesh 302A associated with lower mesh density values may correspond to low frequency regions and regions of the base 3D mesh 302A associated with higher mesh density values may correspond to high frequency regions.

At 308, a base normal map 308A may be computed based on vertex normal information included in the base 3D mesh 302A. In at least one embodiment, the circuitry 202 may be configured to compute the base normal map 308A based on the vertex normal information included in the base 3D mesh 302A. The base normal map 308A may be a RGB map in world-space or object-space which may be computed from the base 3D mesh 302A. The base normal map 308A may provide a 2D visualization of the surface of the base 3D mesh 302A and may be reconstructed from the vertex normal information.

The vertex normal information (included in the base normal map 308A) may be indicative of a direction in which each vertex of the set of vertices of the base 3D mesh 302A may be pointing towards. The circuitry 202 may use the vertex normal information for the computation of the base normal map 308A. The base 3D mesh 302A may further include surface normal information that may be indicative of the surface orientation (i.e., surface normal) associated with each surface (i.e., face of a polygon) of a set of surfaces of the base 3D mesh 302A. The vertex normal information may be derived based on the surface normal information. For example, a vertex normal of a vertex of the base 3D mesh 302A associated with two surfaces of the base 3D mesh 302A may be an average of the surface normal directions associated with the two surfaces.

In accordance with an embodiment, the computation of the base normal map 308A may be based on vertex location information associated with vertices of the base 3D mesh 302A. The vertex location information may be included in the base 3D mesh 302A and may be used for the computation of the base normal map 308A if information associated with the normal of each vertex of the set of vertices of the base 3D mesh 302A (i.e., the vertex normal information) is not available.

The computed base normal map 308A may be indicative of surface orientation associated with each point on the surface of the scanned object or the surface normal of each surface (i.e., the face of a polygon representing the corresponding surface) or vertex of the base 3D mesh 302A. The surface orientation or surface normal representative of directions (or axes in 3D space) may be indicated by a color. For example, if a point on the surface of the scanned object or a surface of the base 3D mesh 302A is determined as pointing towards outward direction (i.e., towards a viewer of the object), the point or the surface may be indicated by the color "blue". On the other hand, points or surfaces pointing towards the upward direction may be indicated by the color "green" and points or surfaces pointing towards the sides may be indicated by the color "red".

At 310, a corrected photometric surface normal 310A may be generated based on an application of a correction on the photometric surface normal 304A. In at least one embodiment, the circuitry 202 may be configured to generate the corrected photometric surface normal 310A based on the application of the correction on the photometric surface normal 304A. The correction, to be applied on the photometric surface normal 304A, may be determined based on the mesh density map 306A and the base normal map 308A. The correction may be required to be applied on the acquired photometric surface normal 304A due to inclusion of inconsistent low-frequency information in the photometric surface normal 304A. The photometric surface normal 304A may be in world-space or object-space and, hence, may be converted to a tangent-space for generation of a relightable asset (i.e., a 3D model) of the scanned object. However, due to the inclusion of inconsistent low-frequency information in the photometric surface normal 304A, undesirable low frequency variations may appear in a tangent map that may be generated based on the photometric surface normal 304A. For prevention of appearance of such low frequency variations, the corrected photometric surface normal 310A may be used for generation of the tangent map.

In accordance with an embodiment, the determined correction may correspond to an amount of rotation that may be applicable on the photometric surface normal 304A for removal of inconsistent low-frequency information included in the photometric surface normal. The circuitry 202 may be configured to apply the determined correction, i.e., rotate the acquired photometric surface normal 304A by the determined amount based on the mesh density map 306A and the base normal map 308A. The rotation of the photometric surface normal 304A may update the surface normal of each pixel of at least two images of the set of images 302B that may be representing a set of points on the surface of the scanned object. The surface normal of each pixel may be contributing to the inconsistency in the low-frequency information components included in the photometric surface normal 304A. Therefore, the rotation of the photometric surface normal 304A may lead to an elimination of inconsistent low-frequency information from the photometric surface normal 304A. The base normal map 308A may be used as a reference for rotating the photometric surface normal 304A and the degree of removal of low-frequency information components based on the rotation may be controlled based on the mesh density map 306A. For example, the elimination of low-frequency information may be greater in low-density regions of the mesh density map 306A compared to high-density regions of the mesh density map 306A. Based on the rotation of the photometric surface normal 304A, the corrected photometric surface normal 310A may be generated.

At 312, a tangent map 312A may be generated. In at least one embodiment, the circuitry 202 may be configured to generate the tangent map 312A based on the corrected photometric surface normal 310A and a UV coordinate map 312B of the base 3D mesh 302A. The generation of the tangent map 312A may be based on a conversion of the corrected photometric surface normal 310A from the world-space or object-space into the tangent-space. The conversion of the corrected photometric surface normal 310A may be based on the UV coordinate map 312B of the base 3D mesh 302A. The circuitry 202 may be configured to extract the UV coordinate map 312B from the base 3D mesh 302A. The UV coordinate map 312B may be a 2D rendering of the base 3D mesh. The extraction of the UV coordinate map 312B may be based on mapping of each 3D point (i.e., 3D coordinates of location of each vertex of the base 3D mesh) to 2D coordinates "U" and "V". The mapping may correspond to a projection of the 3D surface representation of the scanned 3D object (i.e., the base 3D mesh 302A) onto a 2D image.

In accordance with an embodiment, the corrected photometric surface normal 310A may be converted into the tangent map 312A by use of the extracted UV coordinate map 312B. The tangent map 312A may not include low-frequency variations and may be used for photorealistic reconstruction of the surface of the scanned object. The circuitry 202 may apply the tangent map 312A to the base 3D mesh 302A to generate a 3D mesh (i.e., the photorealistic reconstruction of the surface of the scanned object) that includes texture details associated with the tangent map 312A. The extraction of the UV coordinate map 312B may from the base 3D mesh 302A may enable generation of texture details and inclusion of the generated texture details to each face (i.e., side of a polygon) of the base 3D mesh 302A. The inclusion of the texture details to the base 3D mesh 302A may lead to the generation of the 3D mesh.

Figure 4:
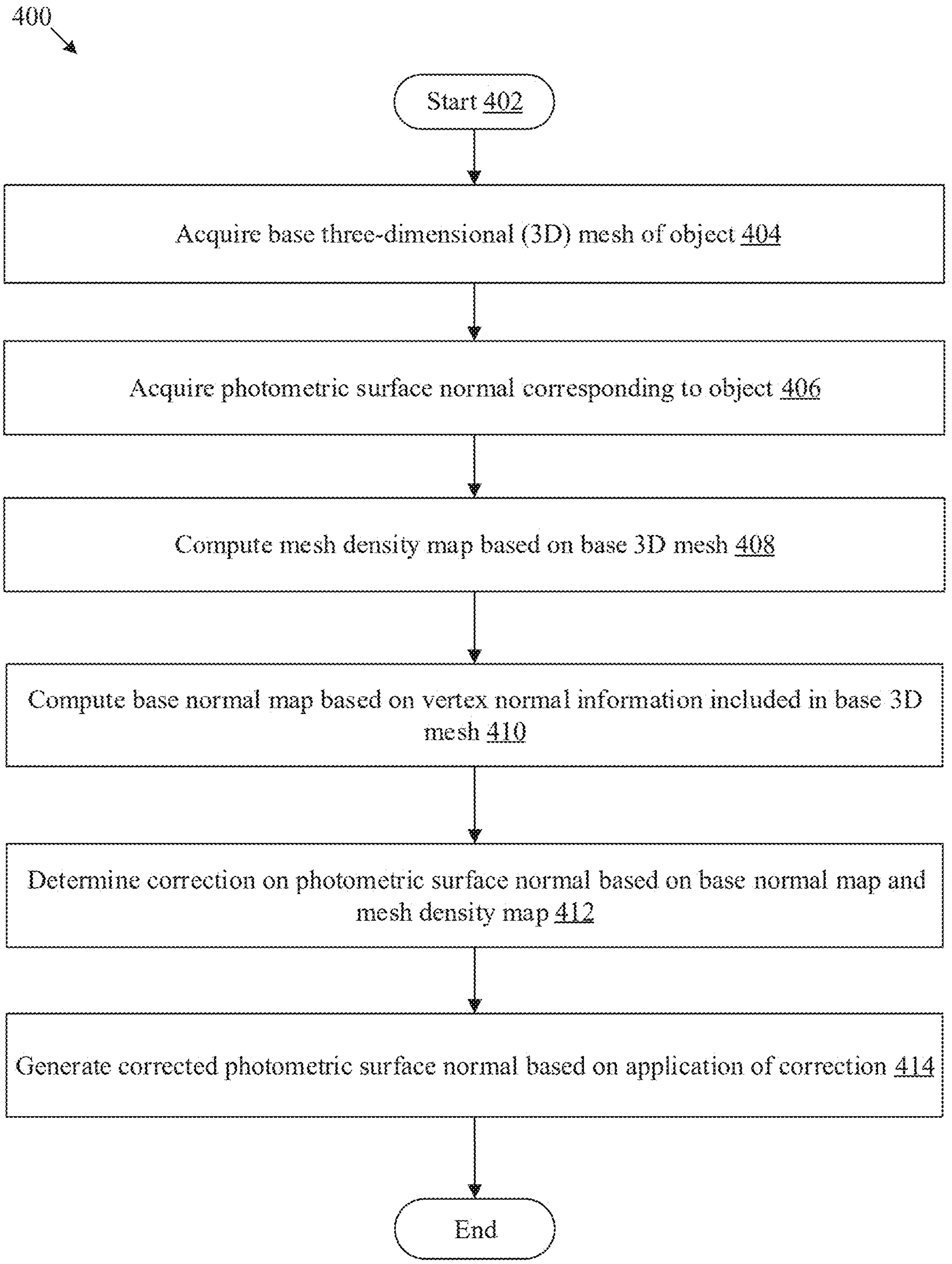
FIG. 4 is a flowchart that illustrates operations for an exemplary method for normal and mesh detail separation for photometric tangent map creation, in accordance with an embodiment of the disclosure.

FIG. 4 is a flowchart that illustrates operations for an exemplary method for normal and mesh detail separation for photometric tangent map creation, in accordance with an embodiment of the disclosure. FIG. 4 is explained in conjunction with elements from FIGS. 1, 2, and 3. With reference to FIG. 4, there is shown a flowchart 400. The operations from 402 to 414 may be implemented by any computing system, such as, by the system 102 of FIG. 1. The operations may start at 402 and may proceed to 404.

At 404, a base 3D mesh of an object may be acquired. In at least one embodiment, the circuitry 202 may be configured to acquire the base 3D mesh of the object. The details of acquisition of the base 3D mesh of the object, are described, for example, in FIG. 1 and FIG. 3.

At 406, a photometric surface normal corresponding to the object may be acquired. In at least one embodiment, the circuitry 202 may be configured to acquire the photometric surface normal corresponding to the object. The details of acquisition of the photometric surface normal are described, for example, in FIG. 1 and FIG. 3.

At 408, a mesh density map may be computed based on the base 3D mesh. In at least one embodiment, the circuitry 202 may be configured to compute the mesh density map based on the base 3D mesh. The details of computation of the mesh density map, are described, for example, in FIG. 1 and FIG. 3.

At 410, a base normal map may be computed based on vertex normal information included in the base 3D mesh. In at least one embodiment, the circuitry 202 may be configured to compute the base normal map based on vertex normal information included in the base 3D mesh. The details of computation of the base normal map, are described, for example, in FIG. 1 and FIG. 3.

At 412, a correction on the photometric surface normal may be determined based on the base normal map and the mesh density map. In at least one embodiment, the circuitry 202 may be configured to determine a correction on the photometric surface normal based on the base normal map and the mesh density map. The details of determination of the correction, are described, for example, in FIG. 1 and FIG. 3.

At 414, a corrected photometric surface normal may be generated based on an application of the correction. In at least one embodiment, the circuitry 202 may be configured to generate the corrected photometric surface normal based on the application of the correction. The details of generation of the corrected photometric surface normal, are described, for example, in FIG. 1 and FIG. 3. Control may pass to end.

Although the flowchart 400 is illustrated as discrete operations, such as 604, 406, 408, 410, 412, and 414, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (such as the system 102). The computer-executable instructions may cause the machine and/or computer to perform operations that include acquisition of a base 3D mesh of an object. The operations may further include acquisition of a photometric surface normal corresponding to the object. The operations may further include computation of a mesh density map based on the base 3D mesh. The operations may further include computation of a base normal map based on vertex normal information included in the base 3D mesh. The operations may further include determination of a correction on the photometric surface normal based on the base normal map and the mesh density map. The correction may correspond to an amount of rotation that may be applicable on the photometric surface normal for a removal of a low-frequency bias component from the photometric surface normal. The operations may further include generation of a corrected photometric surface normal based on an application of the correction.

Exemplary aspects of the disclosure may include a system (such as, the system 102 of FIG. 1) that may include circuitry (such as, the circuitry 202). In an embodiment, the system 102 may include a set of light sources (such as the set of light sources 106) and a set of image capture devices (such as the set of image capture devices 108). The system 102 may be configured to control the set of light sources 106 and the set of image capture devices 108. The circuitry 202 may be configured to acquire a base 3D mesh of an object. The circuitry 202 may be further configured to acquire a photometric surface normal corresponding to the object. The circuitry 202 may be further configured to compute a mesh density map based on the base 3D mesh. The mesh density map may include a plurality of points. Each point may represent a local vertex density of a corresponding vertex of the base 3D mesh. The circuitry 202 may be further configured to compute a base normal map based on vertex normal information included in the base 3D mesh. The circuitry 202 may be further configured to determine a correction on the photometric surface normal based on the base normal map and the mesh density map. The correction may correspond to an amount of rotation that may be applicable on the photometric surface normal for a removal of inconsistent low-frequency information that may be included in the acquired photometric surface normal. The circuitry 202 may be further configured to generate a corrected photometric surface normal based on an application of the correction.

In accordance with an embodiment, the circuitry 202 may be further configured to receive a photometric scan of the object. The object may be exposed to dynamic lighting conditions throughout a duration of acquisition of the photometric scan. The photometric scan may include a plurality of images of the object, captured from one or more viewpoints in a 3D space. The circuitry 202 may be further configured to reconstruct a 3D mesh based on the plurality of images included in the photometric scan. The circuitry 202 may be further configured to refine the 3D mesh based on an input from a 3D artist. The refined 3D mesh may correspond to the acquired base 3D mesh.

In accordance with an embodiment, the circuitry 202 may be further configured to generate the photometric surface normal based on a fitment of a surface reflectance model to the plurality of images included in the photometric scan.

In accordance with an embodiment, the circuitry 202 may be further configured to compute the base normal map based on vertex location information associated with vertices of the base 3D mesh.

In accordance with an embodiment, the circuitry 202 may be further configured to extract a UV coordinate map of the base 3D mesh. The circuitry 202 may be further configured to convert the corrected photometric surface normal into a tangent map based on the extracted UV coordinate map. The circuitry 202 may be further configured to apply the tangent map to the base 3D mesh to generate a 3D mesh that carries texture details associated with the tangent map.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A system, comprising:
circuitry configured to:
acquire a base three-dimensional (3D) mesh of an object;
acquire a photometric surface normal corresponding to the object;
compute a mesh density map based on the base 3D mesh, wherein
a plurality of regions of the base 3D mesh is associated with a computation of a plurality of mesh density values,
a first set of regions of the plurality of regions is associated with a first set of mesh density values of the plurality of mesh density values,
a second set of regions of the plurality of regions is associated with a second set of mesh density values of the plurality of mesh density values, and
each of the first set of mesh density values is greater than each of the second set of mesh density values;
compute a base normal map based on vertex normal information included in the base 3D mesh;
determine a correction on the photometric surface normal based on the base normal map and the mesh density map, wherein
the correction on the photometric surface normal corresponds to an amount of rotation on the photometric surface normal,
the correction on the photometric surface normal is associated with a removal of inconsistent low-frequency information that is in the photometric surface normal, and
an amount of the removal of the inconsistent low-frequency information associated with the second set of regions is greater than an amount of the removal of the inconsistent low-frequency information associated with the first set of regions; and
generate a corrected photometric surface normal based on an application of the correction on the photometric surface normal.

2. The system according to claim 1, wherein the circuitry is further configured to:

acquire a photometric scan of the object, wherein the photometric scan includes a plurality of images of the object from at least one of a plurality of viewpoints in a 3D space;

reconstruct a 3D mesh based on the plurality of images; and refine the 3D mesh based on an input from a 3D artist, wherein the refined 3D mesh corresponds to the acquired base 3D mesh.

3. The system according to claim 2, wherein the circuitry is further configured to generate the photometric surface normal based on a fitment of a surface reflectance model to the plurality of images.

4. The system according to claim 3, wherein an exposure of the object to a plurality of dynamic lighting conditions is in a duration of the acquisition of the photometric scan of the object.

5. The system according to claim 1, wherein the mesh density map includes a plurality of points, and each of the plurality of points represents a local vertex density of a corresponding vertex of the base 3D mesh.

6. The system according to claim 1, wherein the circuitry is further configured to compute the base normal map based on vertex location information, and the vertex location information is associated with vertices of the base 3D mesh.

7. The system according to claim 1, wherein the circuitry is further configured to:

extract a UV coordinate map of the base 3D mesh; and convert the corrected photometric surface normal into a tangent map based on the UV coordinate map.

8. The system according to claim 7, wherein the circuitry is further configured to:

apply the tangent map to the base 3D mesh; and generate, based on the application of the tangent map to the base 3D mesh, a 3D mesh that carries texture details associated with the tangent map.

9. A method, comprising:

in a system:

acquiring a base three-dimensional (3D) mesh of an object;

acquiring a photometric surface normal corresponding to the object;

computing a mesh density map based on the base 3D mesh, wherein a plurality of regions of the base 3D mesh is associated with a computation of a plurality of mesh density values, a first set of regions of the plurality of regions is associated with a first set of mesh density values of the plurality of mesh density values, a second set of regions of the plurality of regions is associated with a second set of mesh density values of the plurality of mesh density values, and each of the first set of mesh density values is greater than each of the second set of mesh density values;

computing a base normal map based on vertex normal information included in the base 3D mesh;

determining a correction on the photometric surface normal based on the base normal map and the mesh density map, wherein the correction on the photometric surface normal corresponds to an amount of rotation on the photometric surface normal, the correction on the photometric surface normal is associated with a removal of inconsistent low-frequency information that is in the photometric surface normal, and an amount of the removal of the inconsistent low-frequency information associated with the second set of regions is greater than an amount of the removal of the inconsistent low-frequency information associated with the first set of regions; and generating a corrected photometric surface normal based on an application of the correction on the photometric surface normal.

10. The method according to claim 9, further comprising:

acquiring a photometric scan of the object, wherein the photometric scan includes a plurality of images of the object from at least one of a plurality of viewpoints in a 3D space;

reconstructing a 3D mesh based on the plurality of images; and refining the 3D mesh based on an input from a 3D artist, wherein the refined 3D mesh corresponds to the acquired base 3D mesh.

11. The method according to claim 10, further comprising generating the photometric surface normal based on a fitment of a surface reflectance model to the plurality of images.

12. The method according to claim 10, wherein an exposure of the object to a plurality of dynamic lighting conditions is in a duration of the acquisition of the photometric scan of the object.

13. The method according to claim 9, wherein the mesh density map includes a plurality of points, and each of the plurality of points represents a local vertex density of a corresponding vertex of the base 3D mesh.

14. The method according to claim 9, further comprising computing the base normal map based on vertex location information, wherein the vertex location information is associated with vertices of the base 3D mesh.

15. The method according to claim 9, further comprising:

extracting a UV coordinate map of the base 3D mesh; and converting the corrected photometric surface normal into a tangent map based on the UV coordinate map.

16. The method according to claim 15, further comprising:

applying the tangent map to the base 3D mesh; and generating, based on the application of the tangent map to the base 3D mesh, a 3D mesh that includes texture details associated with the tangent map.

17. A non-transitory computer-readable medium having stored thereon, computer-executable instructions which, when executed by a system, cause the system to execute operations, the operations comprising:

acquiring a base three-dimensional (3D) mesh of an object;

acquiring a photometric surface normal corresponding to the object;

computing a mesh density map based on the base 3D mesh, wherein a plurality of regions of the base 3D mesh is associated with a computation of a plurality of mesh density values, a first set of regions of the plurality of regions is associated with a first set of mesh density values of the plurality of mesh density values, a second set of regions of the plurality of regions is associated with a second set of mesh density values of the plurality of mesh density values, and each of the first set of mesh density values is greater than each of the second set of mesh density values:

computing a base normal map based on vertex normal information included in the base 3D mesh;

determining a correction on the photometric surface normal based on the base normal map and the mesh density map, wherein the correction on the photometric surface normal corresponds to an amount of rotation on the photometric surface normal, the correction on the photometric surface normal is associated with a removal of inconsistent low-frequency information that is in the photometric surface normal, and an amount of the removal of the inconsistent low-frequency information associated with the second set of regions is greater than an amount of the removal of the inconsistent low-frequency information associated with the first set of regions; and generating a corrected photometric surface normal based on an application of the correction on the photometric surface normal.

* * * * *